Dec. 29, 1953 M. MOORE 2,664,015
LOCKING MECHANISM FOR RESTRAINING MOVEMENT OF AN
OPERATING MEMBER FROM A PREESTABLISHED POSITION
Filed April 21, 1952 3 Sheets-Sheet 2
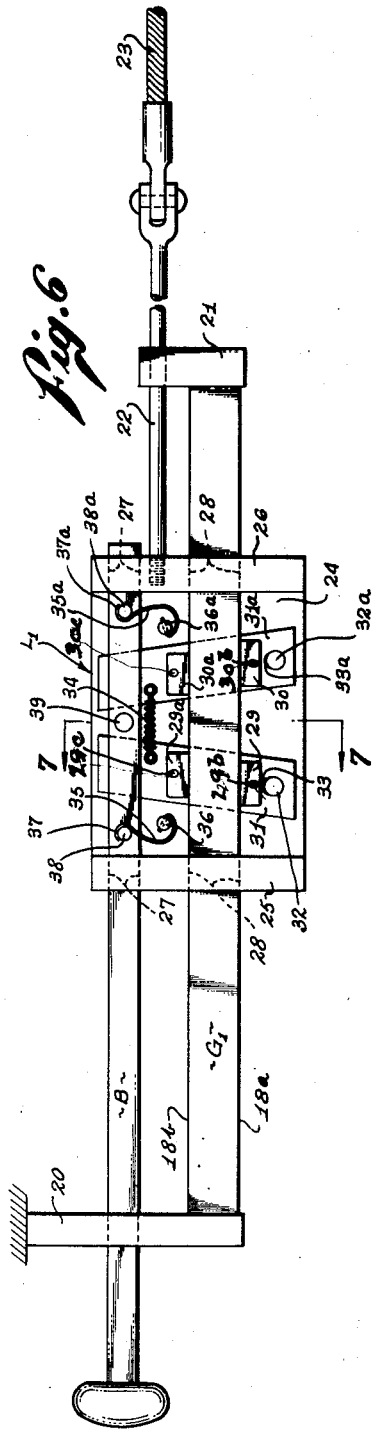
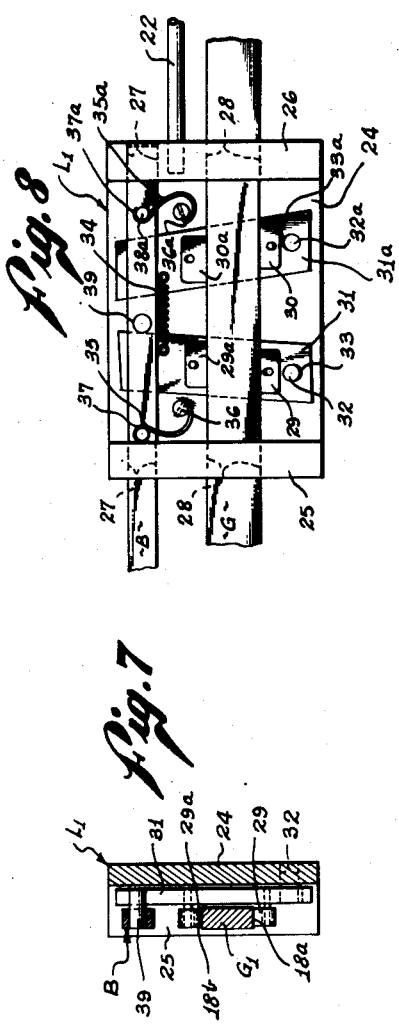
INVENTOR.
MAHER MOORE
BY
Attorney

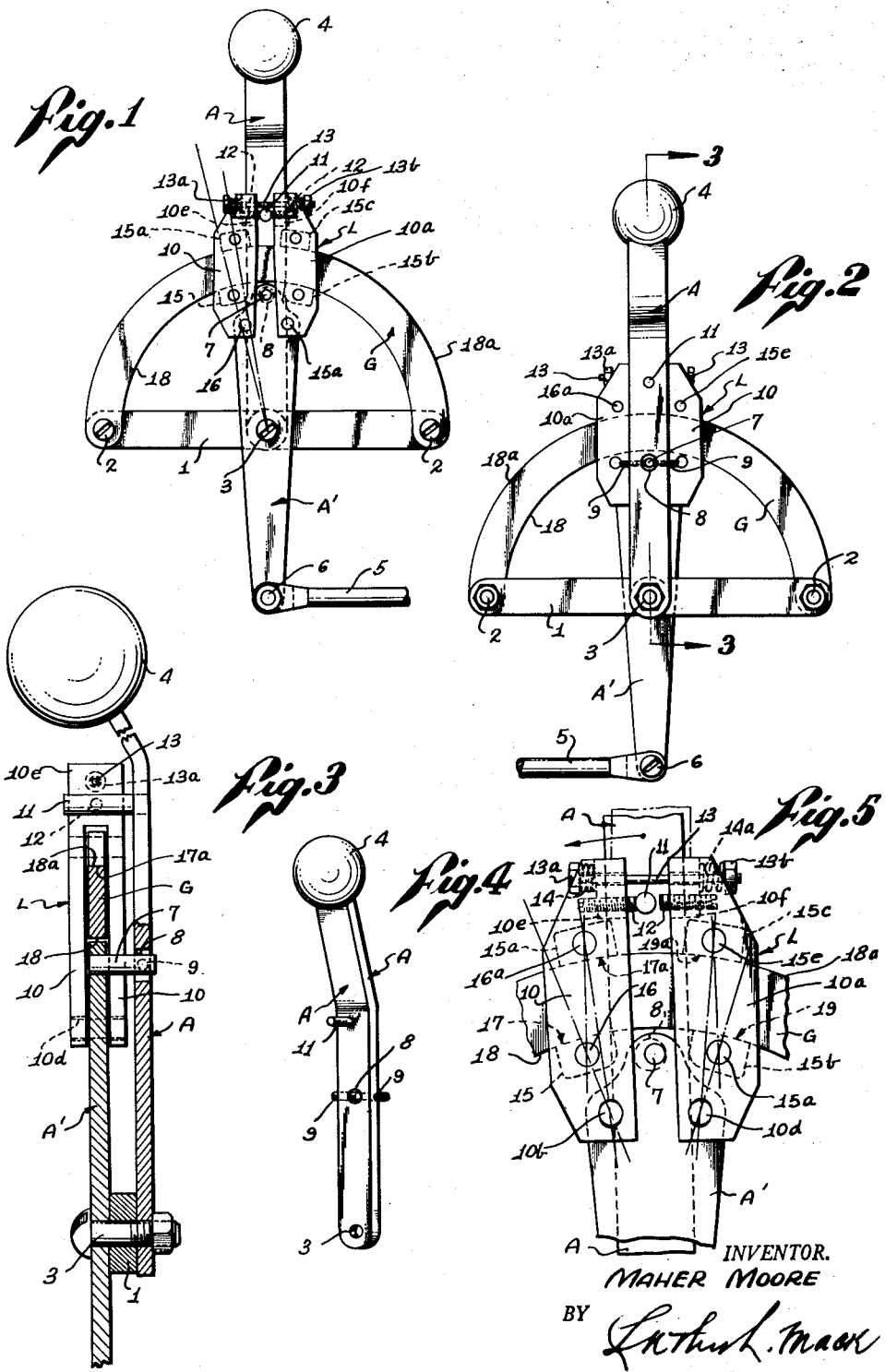

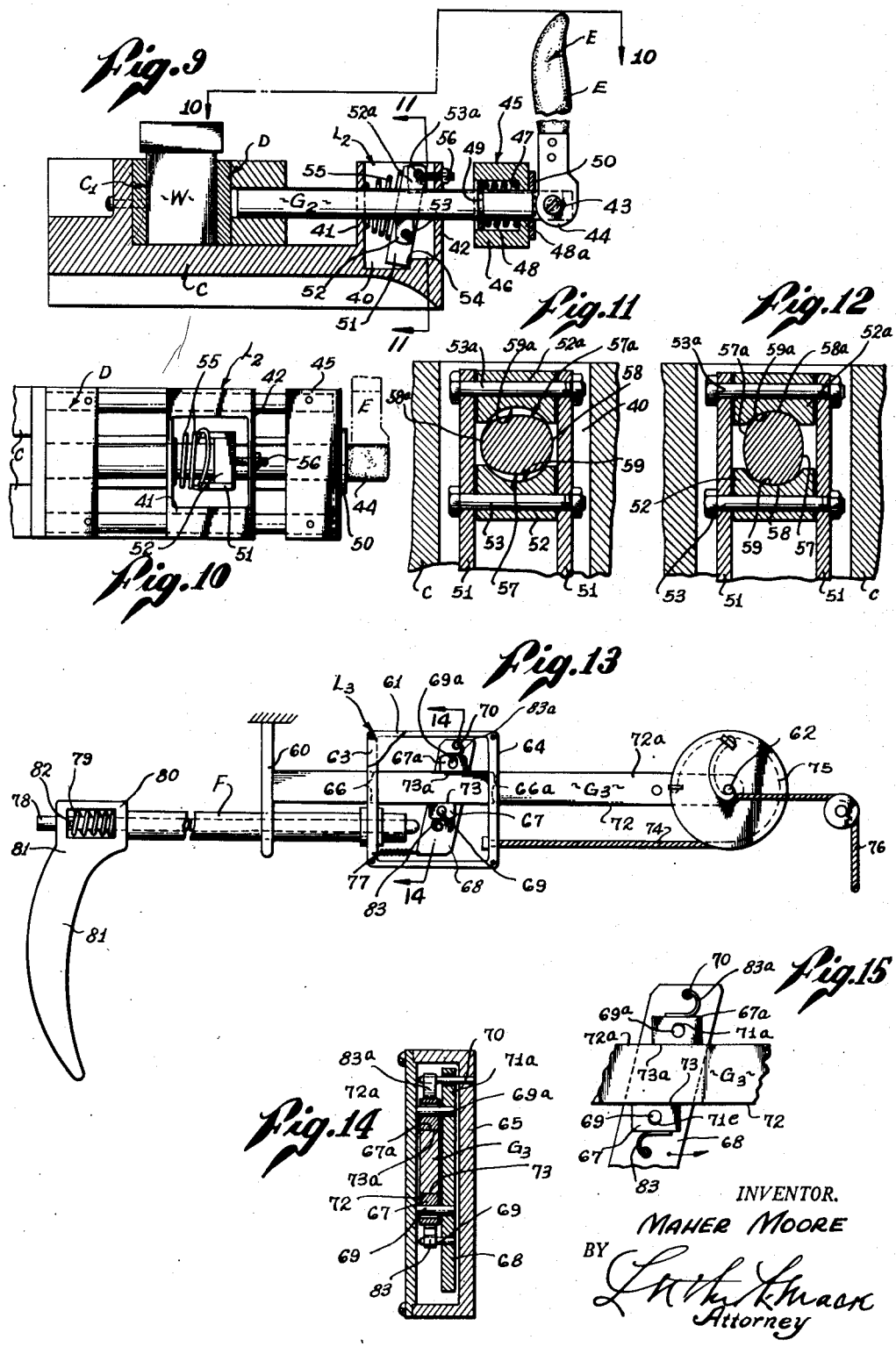

Patented Dec. 29, 1953

2,664,015

UNITED STATES PATENT OFFICE 2,664,015

LOCKING MECHANISM FOR RESTRAINING MOVEMENT OF AN OPERATING MEMBER FROM A PREESTABLISHED POSITION

Maher Moore, Los Angeles, Calif.

Application April 21, 1952, Serial No. 283,318

10 Claims. (Cl. 74—531)

This invention relates in general to a locking mechanism for preventing unintentional retractive movement of a unit or member from an intentionally established position, but more particularly relates to and has for an object the provision of a simple, economical and effective lock applicable with equal effect and but slight modification to throttle controls for automotive, industrial and aeromotive use, bench and machine tool vises, automotive and industrial brake mechanisms and various other controls, devices and apparatus.

I am aware that other locking devices have been heretofore used which employed contracting or expanding bands and shoes and tiltable plates for frictional engagement with a lockable member or unit, one form of which is shown in Letters Patent of the United States, No. 2,415,303 granted to me on February 4, 1947, and modifications of the structure shown therein in my pending application Serial No. 260,656, filed December 8, 1951. In said patent and application different forms of tiltable plates arranged as in a well known bayonet lock are shown with the plates apertured or recessed to provide spaced surfaces frictionally engageable with opposite surfaces of a stationary or movable guide whereby unintentional movement of a member or unit in one direction is prevented from a preestablished position while permitting free movement thereof in an opposite direction. Such devices, however, were not dependable under all conditions of use and in connection with all types of apparatus to which they were applied, principally because the plates gripped the lockable member only at the corner edges of the frictional surfaces of the plates, or required hardening of the lockable member and plates in order to reliably lock said member without impairing its locking surfaces.

Hence it is an important object of this invention to provide a lock embodying spaced shoes pivotally mounted on a common tiltable support so as to be self accommodatable to the opposite surfaces of the lockable member regardless of the inclination of their support so as to grip and prevent relative retractive movement of a locking unit and a lockable unit from preestablished positions while permitting release and free forward intentional movement of one of said units.

An object, more specifically, is to provide a locking mechanism comprising in combination with a stationary member or frame of a guide, a lockable unit and a locking unit one of which units is adjustable relative to the other unit either on or with said guide, and wherein the guide has a pair of cross sectionally opposite surfaces of flat or arcuate character, a tiltable support fulcrumed at one extremity, and a pair of shoes pivotally mounted on said support at opposite sides of the lockable member or guide as the case may be and having surfaces frictionally engageable with the opposite surfaces of the lockable member or guide, said shoes being arranged to grip the lockable member or guide over an optimum area for respectively preventing retraction of the locking unit on the lockable unit or guide from a preestablished position when the shoes and their support are tilted to a maximum extent in one direction and to release the shoes when they with their support are tilted in opposite direction as by intentional movement of one of said units.

Other objects include the provision of means for resiliently urging the shoes into normal engagement with the lockable unit or guide, and for limiting the tiltability of the shoes and their support to an optimum extent for dependable operation.

Still other objects may appear as the description progresses.

Obviously, the application of my improved lock to various types of devices requires modification of the structure. Hence, when used on a bench or machine tool vise for locking the movable jaw in cooperative position with the stationary jaw, the locking unit is usually stationary while the movable jaw constitutes the lockable unit and has a guide movable therewith relative to the locking unit.

When applied to a throttle control for automotive, industrial or aeromotive use of the quadrant type, the usual manually operable member serves as the lockable member on which the locking unit is mounted for movement relative to and is adapted to be locked on the arcuate quadrant bar or guide.

A push and pull type of throttle control requires a stationary straight guide, a manually operable pull rod forming a lockable unit and a locking unit movable with and by said pull rod and relative to the guide.

When applied to a vehicle or other type of brake to restrain rotary movement of a unit a slidable pull rod serves as the lockable unit and is attached to and serves to bodily move a locking unit therewith relative to a stationary straight guide.

In all of the aforesaid cases the operation and effect is the same except for minor structural details.

I have shown preferred forms of locking mechanisms embodying my invention in the annexed drawings, subject to modification, within the scope of the appended claims, without departing from the spirit of the invention.

In said drawing:

Fig. 1 is a front view, in elevation, of a form of the invention applied to a quadrant type throttle control unit;

Fig. 2 is a rear elevational view of the same;

Fig. 3 is a sectional elevation thereof on line 3—3 of Fig. 2;

Fig. 4 is a detached perspective view of the manually operable throttle control lever;

Fig. 5 is an enlarged fragmentary front view of the locking unit shown in Fig. 1;

Fig. 6 is a side elevation of a push and pull rod type of throttle control with a modified form of locking unit applied thereto;

Fig. 7 is a cross sectional view on line 7—7 of Fig. 6;

Fig. 8 is a side view of the locking unit shown in Fig. 6;

Fig. 9 is a cross sectional view of a vise for bench or machine tool use, as on a drill press, for gripping an object during an operation, and showing another modification of the locking unit;

Fig. 10 is a top plan view of the same as seen on line 10—10 of Fig. 9;

Figs. 11 and 12 are similar cross sectional views of the same, as on line 11—11 of Fig. 9 but showing the operating member in different positions, as when the vise is unlocked and locked, respectively;

Fig. 13 is a side view of a pull rod type of vehicle brake control with still another modification of locking unit;

Fig. 14 is a cross sectional view of the same on line 14—14 of Fig. 13; and

Fig. 15 is a detached view of the locking shoes and their support as when in locking position.

Referring, first to the quadrant type of throttle control shown in Figs. 1 to 5, inclusive: there is shown a conventional type of aeromotive throttle control including a stationary quadrant having a horizontal bar 1 adapted to be secured to the airframe at points 2, 2 and at the same points to an arcuate guide G of usual 180 degrees extent. A manually operated primary lever A is pivotally secured to bar 1 at 3 and extends upwardly for a convenient distance above guide G and has a handle 4 thereon by means of which the throttle control lever is moved over the quadrant on the joint axis 3 of the quadrant G and lever A for accelerating or decelerating a motor.

A secondary lever A' is co-pivoted at 3 with lever A on bar 1 and is connected with and for operation by lever A in the manner hereinafter described. Also, lever A' is arranged for connection with a carburetor or other unit (not shown) as by means of a cable 5 secured to the lower portion of lever A' at 6.

Lever A' is adjustably secured to lever A by means of a pin 7 fixed to lever A' and extending through a larger aperture 8 in lever A so as to afford precise adjustment of levers A and A' as by means of axially alined set screws 9, 9 inserted at opposite edges of lever A and bearing against opposite points on pin 7. The levers A and A' together with the device with which cable 5 is connected constitute the lockable unit of this assembly.

A locking unit generally represented at L includes a mounting including two separate pairs of plates 10 and 10a. Each pair of plates is pivoted near their lower ends to lever A' on pins 10b and 10d, respectively, which seat in slightly elongated slots in said plates and the plates of each pair are disposed on opposite sides of lever A' and are joined at their upper extremities by blocks 10e and 10f. A centering pin or stop 11 is fixed to lever A and extends outwardly from the lever between the blocks 10e and 10f for limiting the inward swing of the mounting plates 10 and 10a. Precise centering of said mounting plates is effected by the employment of coaxial set screws 12, 12 borne by blocks 10e and 10f. Each screw 12 is independently adjustable for engagement with opposite portions of pin 11 at their inner ends. A pin 13 is extended through blocks 10e and 10f and bears nuts 13a and 13b on the outer ends thereof between which nuts and the adjacent blocks 10e and 10f springs 14 and 14a, respectively, are compressed for urging the plates 10 and 10a toward each other to an extent permitted by pin 11.

The pair of plates 10—10 support a pair of shoes 15 and 15a which are pivotally held thereon at 16 and 16a, respectively; while similar shoes 15b and 15c are borne by plates 10a—10a on pivots 15d and 15e, respectively.

It will be noted by reference to Figs. 1 and 5, particularly that the axes of the outermost shoes of each pair are on different radial lines from the axes 10b and 10d of the mounting plates than the innermost shoes and are also on different radial lines from the axis of levers A and A'. That feature is important because in order to assure locking engagement of the inner surfaces 17 and 17a of shoes 15 and 15a with inner and outer surfaces 18 and 18a of guide G and surfaces 19 and 19a with said guide surfaces 18 and 18a, respectively, it is necessary that one of each pair of shoes should be sufficiently in advance of the other shoe of a pair to cause a cramping and binding effect of the two shoes of each pair which maximizes the friction between the shoes and cross sectionally opposite surfaces of the guide to an extent which can not be overcome by any tendency of the levers A and A' to retract from a preestablished position as by means of forces applied directly or indirectly to either of the levers A or A' through a sudden jerk or pull on cable 5 or by centrifugal or gravitational forces applied to lever A or A' and occasioned by impact, sudden thrusts, banks, change of direction of airplanes or vehicles to which the lock is applied. The shoes are of such size as to provide an optimum area over which the frictional locking effect is distributed and their surfaces may be flat or arcuate crosswise or longitudinally to correspond to the surfaces 18 and 18a of the guide G.

The two sets of shoes 15—15a and 15b—15c are arranged on opposite sides of the center of levers A and A' and are reversely tilted so that as lever A is moved in a clockwise or counterclockwise direction to advance or retract the throttle as viewed in Fig. 2, said lever may be freely moved because one pair of shoes will be free from locking engagement with guide G while the other pair of shoes will be released from the guide by applying force to lever A. In neither case can the shoes be released from the guide by application of force to lever A' which would tend to move said levers correspondingly as viewed in Fig. 1. The leftward pair of shoes 15 and 15a resists counterclockwise movement of levers A and A' and the rightward shoes 15b and 15c resist clockwise movement of said levers by forces applied to lever A. Intentional application of force to lever A, however, releases the effective pair of shoes and permits ready operation of said levers in either direction.

In Figs. 6, 7 and 8 there is shown a push and pull type of throttle control lock in which a pull rod B represents the lockable element and is slidably mounted on a suitable stationary part 20 of an airframe or vehicle chassis. $L_1$ represents a locking unit movable with rod B, $G_1$ represents a stationary guide supported at one end in part 20 and at its other end in a part 21, 22 represents an operated rod fixed to locking unit $L_1$, slidable in part 21 and connected with a cable 23 leading to a control unit such as a throttle valve.

In the push and pull device the locking unit $L_1$ is slidable relative to the fixed guide $G_1$ and includes a base 24 with end flanges 25 and 26 correspondingly extended from the same side of the base. Flanges 25 and 26 are correspondingly bored or broached at 27, 27 and at 28, 28 to respectively receive rod B and guide $G_1$. Rod B is suitably secured to one or both of said flanges to effect movement of locking unit $L_1$ when said rod is moved. Unit $L_1$ is freely slidable on guide $G_1$ which as shown is of rectangular cross section but may as well be of round or oval cross section, as shown in Figs. 11 and 12.

Unit $L_1$ includes two locking units which are similar in structure and effect to those shown in Fig. 5. Pairs of shoes 29—29a and 30—30a are pivotally mounted at opposite sides of guide $G_1$ on tilted plates 31 and 31a, respectively, which are fulcrumed on pins 32 and 32a and engage slightly elongated slots 33 and 33a in said plates respectively, to permit slight but self-adjustment of each pair of shoes and their tiltable supports 31 and 31a relative to the guide $G_1$.

Shoes 29 and 29a are pivoted on pins 29b and 29c respectively, and shoes 30 and 30a are similarly pivoted on pins 30b and 30c, respectively, extended from plates 31 and 31a into bores or slots in the associated shoes. It will be noted that the disposition of the shoes of each pair is such that the lowermost shoes are offset outwardly from the uppermost shoes for the same reason and to the same effect as the shoes of Figs. 1 and 5. Plates 31 and 31a are connected by a tension spring 34 at points above guide $G_1$ for normally holding the separate locking units urged to normal locking position on the opposite surfaces 18a and 18b, thereby restraining said locking unit and the pull rod B against movement in either direction by reason of forces applied thereto from cable 23 but yielding to release requisite shoes from the guide when rod B is either pulled or pushed intentionally.

Springs 35 and 35a are anchored to base 24 at points 36 and 36a and have their free ends 37 and 37a bearing against pins 38 and 38a borne by rod B, thereby exerting equal forces on rod B and tending to centralize pin 39 relative to plates 31 and 31a, respectively. Rod B carries a centering pin 39 at a point between and for limiting the tilting of the plates 31 and 31a.

In this form of control as in the quadrant type previously described each pair of shoes resists movement in an opposite direction from the other pair when forces are applied to unit $L_1$ from cable 23 but yields to intentional movement of rod B in either direction to permit resetting of the control to a desired extent.

An important characteristic of my improved locking mechanism is its convenient and ready application to a bench vise as a built-in feature rather than as an accessory device. It is well known that conventional bench vises are of heavy and massive construction with a stationary jaw formed on its base and a screw operated movable jaw between which an object is gripped when the lead screw is manually tightened. Such vises are necessarily expensive due to machine operations and labor required for their production. Moreover, a piece of work must be held by one hand of an operator while his other hand at least initially sets the jaws in gripping contact with the work.

I have shown in Figs. 9 to 12 inclusive a type of vise equipped with my improved lock which, as shown, represents a work holding vise for use on drill presses, milling machines and other machine tools, but which with only minor modifications is equally well adaptable to work bench vises. As herein shown C represents a stationary base having a fixed jaw $C_1$ and D is a lockable unit in the form of a movable jaw, between which and jaw C a piece of work W is adapted to be gripped and held during a mechanical operation on said work. $G_2$ is a guide rod fixed to and movable with jaw D. $L_2$ is a locking unit stationarily supported in a compartment 40 of base C between walls 41 and 42. E is an operating handle pivotally secured at 43 to the outer end of guide $G_2$ and having a hub cam 44 thereon, and 45 is a compression unit borne by guide G rearwardly of cam 44.

Unit 45 includes a sleeve 46 recessed at 47 to house a spring 48 in compression between end web 48a of said sleeve and a retainer in the rear of compartment 47 which is held fixed to guide $G_2$ as by a groove 49 in which the retainer is seated. A steel plate 50 is interposed between web 48a and cam 44 to take the thrust of said cam when handle E is swung downwardly from its position as shown in Fig. 9. Cam 44 has its lowest peripheral point approximately in the horizontal plane of the axis of guide $G_2$ and its highest point almost axially opposite its lowest point. Hence, as shown, when the handle is uppermost the cam exerts no pressure on plate 50 tending to axially move the guide $G_2$ and jaw D and spring 48 is expanded to a maximum extent. When, however, the handle is rotated on its axis 43 to an extent of 180 degrees, more or less, the gradually ascending periphery of cam 44 will engage and force unit 45, guide $G_2$ and jaw D rearwardly against the power of spring 48 until the face of jaw D moves a prepositioned piece of work W into final gripping engagement with and between jaws $C_1$ and D. Initial setting of the jaws is effected by forcing the handle and guide rearwardly as far as possible and thereafter finally locking the jaws on the work in the manner and by the means I will now describe.

Locking unit $L_2$ includes one or a pair of plates 51 on or between which a pair of shoes 52 and 52a are pivotally supported at 53 and 53a respectively at opposite sides of guide $G_2$. Plate or plates 51 instead of being pivotally supported as in other forms herein described are merely seated in the bottom of recess 40 and fulcrumed against a shoulder 54. A spring 55 is compressed between wall 41 and plates 51 and serves to hold the plates and their shoes tilted to an extent limited by a set screw 56 in wall 42 of the base.

As shown in Fig. 9 the plates 51 and their shoes are readily yieldable toward the left to permit the intentional inward thrust of jaw D but are so positioned as to resist and prevent an outward movement and consequent release of work from the jaws.

It will be noted that guide G₂ and handle E are together rotatable in jaw D and walls 41 and 42 of the base for the purpose of intentionally releasing the work at any point in an operation but more particularly for turning the guide G₂ so as to present different pairs of cross sectionally opposite guide surfaces to the shoes 52 and 52a.

Guide G₂ therefore is formed as shown, but not necessarily, with pairs of cross sectionally opposite arcuate surfaces 57—57a and 58—58a of different radius and distances from the axis of the guide.

As shown in Fig. 11 when the guide is positioned with surfaces 57 and 57a adjacent the surfaces 59 and 59a of shoes 52 and 52a respectively, the shoes are unlocked and the guide and movable jaw may be readily moved in either direction. When, however, the guide is positioned as shown in Fig. 12 the surfaces 58 and 58a of the guide will be engaged by the correspondingly arcuate surfaces 59 and 59a of shoes 52 and 52a and will then be capable of lockingly engaging the shoes.

Hence, when the handle is upright or horizontal the jaw D may be freely moved to nominal or initial work engaging position, and when turned on its axis to downward position and rotated the guide G₂ will be rotated to an extent of ninety degrees for alining the locking surfaces of the guide with those on the shoes.

The type of locking unit shown in Figs. 13 to 15 inclusive, employs the same principle as the types herein previously described but with minor structural modifications to adapt the lock to a vehicle brake control means. This form of locking mechanism includes a lockable member in the form of a push and pull rod F which is slidable in a stationary part 60 of a vehicle frame and is permanently fixed to the body 61 of a locking unit L₃ which is bodily slidable on a stationary guide G₃ secured to part 60 and otherwise suitably supported at a point near its rear end as on a shaft 62. Body 61 has spaced walls 63 and 64 and a connecting web 65. Walls 63 and 64 are broached at 66 and 66a to slidably receive guide G₃.

Shoes 67 and 67a are pivotally held on a tiltable support 68 on pins 69 and 69a respectively extended from said support, and support 68 is pivotally mounted near one extremity as at 70 on web 65 of body 61. Pins 69 and 69a extend through slightly enlarged slots 71 and 71a respectively, in the shoes, so as to permit slight self-adjustment of the shoes to frictional contact with cross sectionally opposite surfaces 72 and 72a of member G₃ as the support 68 and shoes are tilted. In this type of lock as in the types hereinbefore described, the shoes are normally disposed in offset relationship especially with respect to a radial line from the axis 70 of support and also with respect to a line drawn at a right angle from the longitudinal axis of guide G₃.

Thus, the shoes 67 and 67a which have surfaces 73 and 73a are caused to frictionally engage the cross sectionally opposite surfaces 72 and 72a, respectively of guide G₃ at transversely offset points so that when the support 68 is appropriately tilted the shoes will bind on the guide and restrain the locking unit against retractive movement from a preestablished position.

Any type of brake tensioning device may be connected with unit L₃, such as a cable 74 leading to a pulley 75 on shaft 62 and in turn connected with a brake unit (not shown) as by means of a cable 76.

Support 68 and shoes 67 and 67a are preferably tensioned on body 61 as by means of a spring 77 which is secured at opposite ends to a wall as at 63 of body 61 and to the free end of support 68. Thus the shoes are normally held in locking position against guide G₃ and may be released only by means of a push rod 78 which is slidable in rod F and is engageable at its inner end at a point on or within body 61 with the free end of support 68. A spring 79 is mounted in a recess of a hub 80 on handle 81 and is compressed between the rear end of said recess and a pin 82 is extended through rod 78. Spring 79 therefore continuously urges rod 78 away from support 68 to a desired extent but when the release rod is pushed inwardly the lock between shoes 67 and 67a is broken and as long as rod 78 is thrust inwardly the locking unit L₃ is bodily movable in either direction by pulling or pushing handle 81. Springs 83 and 83a are anchored on pins 69 and 70 respectively and bear against the outer surfaces of shoes 67 and 67a with sufficient tension to hold the inner surfaces of the shoes in constant contact with surfaces 72 and 72a of member G₃.

In the last mentioned form of device it is apparent that to tighten the brakes of a vehicle a pull on handle grip 81 will correspondingly move locking unit on the stationary guide G₃ and through the connected cables 74 and 76 and pulley 75 the brake bands or shoes will correspondingly be moved into locking engagement with their associated drums. Such movement serves to reversely tilt support 68 and the shoes 67 and 67a thereon to an extent which will unlock or release the grip of the shoes on guide G₃. Upon release of handle 81 the support 68 will resume a locking position and any forces applied thereto from cable 74 which tend to release the shoes from the guide will be resisted and prevented. However, reverse movement of unit L₃ can be readily accomplished intentionally by pressure applied to handle 81 and release rod 78 which unlocks the shoes from the guide and permits reestablishment of unit L₃ on the guide at any desired position.

Comparison of the different methods and slight differences in the structure and hook-up of the several elements of my locking mechanism will show that the principle is the same in all forms shown and described although the manner of adaptation and employment of said principle for diversified purposes is different in some respects from others.

For example in the types of lock shown in Figs. 1, 6 and 13, the locking unit is moved with and by the manually operable member, whereas, in the type shown in Figs. 9 to 12 inclusive, the locking unit is stationary while the guide is movable. In the types of Figs. 1, 6 and 13 the guide is stationary. In the type of Figs. 1 to 5 inclusive the operating member and the locking unit are moved arcuately over a stationary quadrant. In only one type shown (Fig. 9), the operating member and guide are rotatable together on a common axis for presenting different pairs of locking surfaces to the shoes for respectively locking the lockable jaw of the vise against accidental or unintentional retraction, and a handle is rotatable on the guide for movement into a position whereat the movable jaw may be adjusted, from an initial work engaging position to a final work gripping position.

It may be noted that the shoes are so mounted on their tiltable supports and said supports are so mounted on the lock bodies as to permit ready self adjustment of the shoes, regardless of their positions and inclination, toward and away from locking engagement with an associated guide or blockable member or unit. Features employed for such purposes include the provision of requisite clearance around each or some of the fulcrum pins of the shoe supports and of the shoe pivots, as described or otherwise, and springs such as 14 and 14a in Fig. 5, 34 in Fig. 6, 55 in Fig. 9, and 77, 83 and 83a in Fig. 13.

I claim:

1. A locking mechanism comprising: the combination with a stationary frame and a guide, of a lockable unit and a locking unit, one of which units is slidably related to the other unit, said guide having cross sectionally opposite surfaces uniformly spaced apart, said locking unit including a support tiltably mounted on said frame and fulcrumed at one extremity, and a pair of shoes pivotally held on said support between their ends and disposed at opposite sides of said guide for frictional locking engagement with said opposite surfaces of said guide when said support is tilted in a given direction by intentional movement of one of said units relative to the other while permitting free movement of the same unit in an opposite direction.

2. A locking mechanism as characterized in claim 1 including means for yieldably urging said support to an inclined position whereat said shoes will frictionally engage said cross sectionally opposite surfaces of said guide.

3. A locking mechanism as characterized in claim 1 said shoes being mounted on said support in positions offset from a radial plane which is coincident with the fulcrum of said support.

4. A locking mechanism comprising: the combination with a stationary frame and a guide, of a lockable unit and a locking unit, one of which units is slidably related to the other unit, said guide having cross sectionally opposite surfaces uniformly spaced apart, said locking unit including a support tiltably mounted on said frame and fulcrumed at one extremity, and a pair of shoes pivotally held on said support between their ends and disposed at opposite surfaces of said guide when said support is tilted in a given direction by intentional movement of one of said units relative to the other while permitting free movement of the same unit in an opposite direction, and means for adjustably limiting the inclination of said shoe support in the movement of said shoes toward locking position.

5. A locking mechanism as characterized in claim 1 including means reversely tilting said support from locking position so as to permit intentional retraction of the lockable unit and its reestablishment to a selected position relative to the locking unit.

6. A locking mechanism as characterized in claim 1 including means for mounting said support and said shoes so as to be self adjustable at different positions relative to said guide.

7. A locking mechanism as characterized in claim 1 said guide being of arcuate form and stationary, said lockable unit including a primary and a secondary lever concentrically mounted with respect to said guide, said locking unit including opposed pairs of frictional shoes having locking surfaces adapted to engage the cross sectionally opposite surfaces of said guide, each pair of shoes having a common tiltable support fulcrumed on said secondary lever, and centering means including cooperating elements borne by said primary lever and by said shoe supports for adjusting the separate pairs of shoes for effective resistance to the retractive movement of said levers in different directions from a preestablished position due to application of unintentional forces to said levers from any source.

8. A locking mechanism as characterized in claim 1 said guide being of arcuate form and stationary, said lockable unit including a primary and a secondary lever concentrically mounted with respect to said guide, said locking unit including opposed pairs of frictional shoes having locking surfaces adapted to engage the cross sectionally opposite surfaces of said guide, each pair of shoes having a common tiltable support fulcrumed on said secondary lever, and centering means including cooperating elements borne by said primary lever and by said shoe supports for adjusting the separate pairs of shoes for effective resistance to the retractive movement of said levers in different directions from a preestablished position due to application of unintentional forces to said levers from any source, and means for adjustably connecting said levers at a point apart from their common axis to regulate and provide cooperation of said levers and said locking unit.

9. A locking mechanism as characterized in claim 1 said guide being of arcuate form and stationary, said lockable unit including a primary and a secondary lever concentrically mounted with respect to said guide, said locking unit including opposed pairs of frictional shoes having locking surfaces adapted to engage the cross sectionally opposite surfaces of said guide, each pair of shoes having a common tiltable support fulcrumed on said secondary lever, and centering means including cooperating elements borne by said primary lever and by said shoe supports for adjusting the separate pairs of shoes for effective resistance to the retractive movement of said levers in different directions from a preestablished position due to application of unintentional forces to said levers from any source and means for resiliently connecting said shoe supports to effect restoration of said shoes to normal locking position on said guide after each operation of said levers.

10. A locking mechanism comprising: the combination with a stationary frame and a guide, of a lockable unit and a locking unit, one of which units is slidably related to the other unit including, said guide having cross sectionally opposite surfaces uniformly spaced apart, said locking unit including a tiltable support fulcrumed at one extremity, and a pair of shoes pivotally held on said support at opposite sides of said guide for frictional locking engagement with said opposite surfaces of said guide when said support is tilted in a given direction by intentional movement of one of said units relative to the other while permitting free movement of the same unit in an opposite direction, said lockable unit including a member movable relative to a stationary member and between which a piece of work is adapted to be gripped, an operating member hinged to said guide, said guide being connected with and for advancing and retracting said movable member in response to movement of said operating member, said locking unit being stationarily supported with said stationary work gripping member, a pressure unit affixed to said guide, and a cam borne by said operating member and adapted to bear against said pressure unit when the operating member is rotated on said guide, for advancing the movable work gripping member into gripping engagement with the work.

MAHER MOORE.

References Cited in the file of this patent

UNITED STATES PATENTS

| Number | Name | Date |
| --- | --- | --- |
| 642,178 | Thomas et al. | Jan. 30, 1900 |
| 1,948,991 | Molly | Feb. 27, 1934 |
| 2,088,880 | Strange | Aug. 3, 1937 |
| 2,159,821 | Sandberg et al. | May 23, 1939 |